(12) United States Patent
Richter

(10) Patent No.: US 9,428,200 B2
(45) Date of Patent: Aug. 30, 2016

(54) DEVICE DISPOSED IN THE ROOF AREA OF TWO ARTICULATED VEHICLE PARTS FOR LIMITING THE PITCH MOVEMENT OF THE VEHICLE PARTS RELATIVE TO EACH OTHER

(71) Applicant: Hübner GmbH & Co. KG, Kassel (DE)

(72) Inventor: Olaf Richter, Malsfeld-Beiseförth (DE)

(73) Assignee: Hübner GmbH & Co., Kassel (DE)

( * ) Notice: Subject to any disclaimer, the term of this patent is extended or adjusted under 35 U.S.C. 154(b) by 290 days.

(21) Appl. No.: 14/175,498

(22) Filed: Feb. 7, 2014

(65) Prior Publication Data
US 2014/0224756 A1 Aug. 14, 2014

(30) Foreign Application Priority Data
Feb. 9, 2013 (EP) .................................. 13000695

(51) Int. Cl.
*B61G 5/02* (2006.01)
*B61D 3/10* (2006.01)
*B61F 5/24* (2006.01)

(52) U.S. Cl.
CPC . *B61G 5/02* (2013.01); *B61D 3/10* (2013.01); *B61F 5/24* (2013.01)

(58) Field of Classification Search
CPC ............. B61G 5/02; B61F 5/24; B61D 3/10; B62D 47/025; B60D 5/00

USPC ............................................................. 105/3
See application file for complete search history.

(56) References Cited

U.S. PATENT DOCUMENTS 5,469,792 A * 11/1995 Lenk ....................... B61D 3/10
105/4.1

FOREIGN PATENT DOCUMENTS

| CN | 1852823 A | 10/2006 |
|---|---|---|
| DE | 4446282 C1 | 4/1996 |
| DE | 10343536 A1 | 5/2005 |
| DE | 102004014903 A1 | 10/2005 |
| DE | 102006013404 A1 | 9/2007 |
| EP | 0983931 A2 | 3/2000 |
| EP | 1038761 A1 | 9/2000 |
| EP | 2500234 A2 | 9/2012 |

OTHER PUBLICATIONS

Office Action from co-pending Chinese patent application Serial No. 201310163432.X, issued Dec. 11, 2015.

* cited by examiner

*Primary Examiner* — Mark Le
(74) *Attorney, Agent, or Firm* — Dinsmore & Shohl LLP; Douglas L. Wathen

(57) ABSTRACT

A device for coupling the roof area of two articulated vehicle parts, for limiting the roll and/or pitch movements of the vehicle parts relative to each other. The device includes at least two consoles. At least one console is disposed on the roof area of a first vehicle part. The at least two consoles are connected to each other by a coupling arm. At least one of the consoles includes a leaf spring.

22 Claims, 3 Drawing Sheets

DEVICE DISPOSED IN THE ROOF AREA OF TWO ARTICULATED VEHICLE PARTS FOR LIMITING THE PITCH MOVEMENT OF THE VEHICLE PARTS RELATIVE TO EACH OTHER

CROSS REFERENCE TO RELATED APPLICATIONS

This application is the U.S. national phase of European Patent Application No. EP 13 000 695.0, filed Feb. 9, 2013, the content of which is incorporated herein in its entirety.

BACKGROUND OF THE INVENTION

The invention relates to a device disposed in the roof area of two articulated vehicle parts, more specifically of a rail vehicle, for limiting the roll and/or pitch movements of the vehicle parts relative to each other, the device comprising at least two consoles, at least one console being respectively disposed in the roof area of a vehicle part, the at least two consoles being connected with each other by a coupling arm.

Joints between connected vehicle parts are sufficiently known. It is more specifically known that the bottom joint bearing must absorb all the forces appearing in the radial and axial direction. This means that this bottom joint bearing serves to transmit forces that appear, as such, during cornering, as well as push and pull forces when braking or pulling such an articulated vehicle.

However, articulated vehicles are also subjected to the effects of a plurality of forces, which are caused in equally great numbers by movements of the vehicle parts relative to each other, namely movements that occur when such a vehicle drives around a curve as well as movements of the vehicle parts relative to each other when such a vehicle drives over bumps or over a crest. In addition to such pitch movements, so-called roll movements of the vehicle parts relative to each other also occur when the vehicle parts are twisted relative to each other about their longitudinal axis. Translational movements also occur when a rail vehicle consisting of several vehicle parts drives for example over an S-shaped railroad switch.

In addition it must be ensured, more specifically with rail-bound vehicles, that the structure gauge of the vehicle remains relatively small. The structure gauge refers to the radial space needed by the vehicle as a whole during travel movements of the vehicle. In this respect, extreme roll movements of the vehicle parts relative to each other particularly result in a great structure gauge. Such a great structure gauge is undesirable in that considerably more space must be provided for the vehicle along the track. Providing a large space for travel movements of the vehicle is correspondingly expensive, more specifically in the construction of underground railways.

In order to prevent roll movements of the vehicle parts relative to each other without having to implement specific measures on the vehicle parts themselves, EP 0 983 931 B1 discloses a slidable lattice stand configured as a joint hinge disposed in the ceiling area, the ends of the joint hinge being articulately connectable to the one or to the other vehicle. Since the slidable lattice stand is arranged transversely to the longitudinal axis of the vehicle, roll movements can be prevented while allowing for pitch movements.

However, more specifically rail-bound articulated vehicles composed of many parts are known, in which only some vehicle parts have a bogie. This means that in a 5 membered vehicle for example, the front, the rear and the middle vehicle part respectively have a bogie. The two vehicle parts located between them are configured in the manner of litters and carried by the adjacent vehicle parts with the respective bogie. In order to prevent them from folding, such vehicles must be substantially rigidly connected to each other. However, several such vehicle parts are nevertheless connected to each other in such a manner that pitch movements between the vehicle parts are possible since driving through hollows or over crests would otherwise not be possible.

In this context EP 1 038 761 B1 discloses disposing a swivel joint in the ceiling area of two hinge-linked vehicles parts, wherein an arm, whose end may be rotatably seized by a claw, is provided on one of the vehicles. The claw has two guide rods disposed at an angle relative to each other for connection with the other vehicle part. Hereby it is essential that the two hinge points, i.e. the hinge in the ceiling area as well as the hinge in the floor area are disposed flush immediately one above the other. In this respect, it is furthermore provided that the two guide arms have an adjustable length. With a connection of the prior art according to the afore-mentioned EP 1 038 761 B1 in connection with a ball joint disposed in the floor between two articulated vehicle parts, the ball joint allowing for three degrees of freedom for rotational movements but being blocked in the Z direction, a pitch movement of the vehicle parts relative to each other is not allowed. Also, roll movements are substantially not allowed by this device. In fact, it is assumed that the vehicle parts or the car bodies are elastic so that they absorb the occurring roll and pitch movements.

As has already been explained in the introduction, movements between vehicle parts of rail-bound vehicles designed in the above manner must be substantially impossible. However, it has been found that for stability reasons, the coachwork of such a vehicle part must be designed to be relatively rigid. It has also been found that when the coachwork of the vehicle parts is rigid and more specifically when such a vehicle part is stressed to the limit, i.e. when the springs are fully loaded and roll movements cannot be absorbed by the coachwork, the roll movements are transferred to the bogie. It is more specifically in such disadvantageous situations that there is a risk that the wheelsets of the bogie are unloaded on one side, which causes a risk of derailment of the vehicle or vehicle parts. This risk exists all the more when the rails or the track bed is heavily worn, for example when the rails on both sides alternately run at different heights, so that such a train must absorb twists in the track bed. More specifically with the afore-mentioned railway train, in which the vehicle parts have a bogie at the front and rear end and the middle vehicle part also has a bogie and a litter-type part is respectively disposed between the vehicle parts having a bogie, there is a risk that one of the wheel flanges will be lifted off the rails. It has already been pointed out elsewhere that it was hitherto assumed that roll movements could be absorbed by the coachwork of the rail vehicle. It has also turned out that particularly when trains travel on track beds that are heavily worn, even if they do not derail, the coachworks are damaged or worn down in a short time due to the impact of strong torsional forces.

In this context, DE 10 2004 014 903 A1 discloses providing a device in the roof area between two vehicle parts of a rail-bound vehicle, which tolerates roll movements to a limited extent. DE 10 343 536 A1 also discloses a device for limiting the roll movements between two vehicle parts.

In detail, such a device disposed in the roof area comprises an arm for connecting the two vehicle parts with each other, the arm being pivotably receivable by respectively one vertical axis on the vehicle parts, thus allowing for a limited roll movement. However, this is disadvantageous in that the limitation of the roll movement sets in abruptly.

DE 10 2006 013 404 B4 discloses another device for limiting the roll movement between vehicle parts of a rail vehicle, which has indeed proven its worth when used in practice but which has a relatively complex structure and is therefore relatively expensive. The same is true of the pitch and roll limitation device known from EP 2 500 234.

SUMMARY OF THE INVENTION

Therefore, the problem underlying the invention consists in providing a device in the roof area of two articulated vehicle parts of a rail vehicle for limiting the pitch and/or roll movements of the vehicle parts relative to each other; such a device must have a relatively simple structure and thus be inexpensive without having to fear limitations with regard to its functionality.

In order to solve the problem, it is proposed according to the invention to design at least one of the consoles in the manner of a leaf spring. Leaf springs are more specifically known in automotive engineering; they can have a progressive or degressive characteristic curve. By using consoles configured in the manner of a leaf spring, it becomes possible to transmit the forces that appear during roll and pitch movements of the articulated vehicle parts in a dampened manner. Hereby, when the at least one consoles configured in the manner of a leaf spring have a more specifically progressive characteristic curve, the displacement of the vehicle parts relative to each other is ultimately also limited. Leaf springs have a conceivably simple configuration and are in this respect also particularly inexpensive to manufacture.

It is more specifically provided to dispose at least respectively one console on the respective vehicle part transversely to the center longitudinal axis of the vehicle parts in an offset position relative to the other console. This means that the two opposite consoles disposed on the respective car bodies of the vehicle parts have a pre-definable gap between each other that runs transversely to the longitudinal axis of the vehicle parts. The two consoles, of which at least one is configured in the manner of a leaf spring, are connected to each other by the coupling arm. The coupling arm has a rigid configuration but has an adjustable length. Due to the offset arrangement of the consoles relative to each other, not only roll movements but also pitch movements between the vehicle parts are transmittable to a limited extent. In addition to the limitation of the corresponding movements, the forces occurring during the roll and pitch movements are also transmitted to the car bodies of the articulated vehicle parts due to the resilient design of the consoles as leaf springs.

It has already been pointed out that leaf springs can have a progressive or a degressive characteristic curve or a combination thereof. In order to provide the leaf spring designed as a console with a progressive or a degressive characteristic curve, it is provided that the individual leaf springs have several leaf spring elements in order to form a leaf spring package. The spring characteristic curve of the leaf spring can be designed to be progressive or degressive, depending on the arrangement of the leaf spring elements.

In more detail, it is provided with regard to the console that it has at least one leg, but that the console configured in the manner of a leaf spring preferably has two legs, which are connected to each other at their free ends. In this respect, a console with two legs can have a dome-shaped configuration for example, wherein the two legs, the free ends of which rest against each other, are connected to each other. This means that when a force is applied transversely to the legs of such a dome-shaped console, the legs are displaced differently with regard to their position relative to the direction of the force application. For a better understanding, it will be said in the following that with the same direction of force application the one leg is subjected to pressure and the other leg is subjected to traction. By equipping the leg designed with regard to pressure with several leaf spring elements in order to form a leaf spring package, this console can have a progressive spring characteristic curve when a force is applied in one direction and also have a progressive spring characteristic curve in the other direction but with a lesser increase. It is thus clear that the principle of using leaf springs as consoles for a continuous or soft transfer of forces into the car bodies of the vehicle parts during roll and pitch movements makes it possible to individually design the spring characteristic curves of the respective console in a simple manner. The design of the spring characteristic curve depends amongst others on the direction of the force application and on mechanical conditions, more specifically on the rigidity of the car bodies on the one hand and on compliance with certain external basic conditions, such as e.g. the specified structure gauge on the other hand. This means that the consoles can be manufactured as construction sets, wherein the individual consoles can be individually designed depending on the magnitude of the force, the desired spring deflection and the direction of the force application. As has already been explained elsewhere, this is implemented simply by designing the leaf springs as leaf spring packages with on the one hand a different number of leaf spring elements and on the other hand a different arrangement of the leaf spring elements relative to each other.

According to a particular feature of the invention, it is provided that the at least one console, but preferably both consoles, comprise a damper. Thus it is clear that by using a damper, e.g. a shock absorber-like piston-cylinder damper, the movement against the force of the console configured as a leaf spring occurs in a dampened manner, so that there is no risk of resonance.

In more detail, it is provided in this context that the damper is hinged with its one end in the area of the free end of the console and with its other end to the vehicle part that accommodates the console. This means that the damping occurs between the console and the vehicle part or the car body of the vehicle part.

BRIEF DESCRIPTION OF THE FIGURES

In the following, the invention is exemplarily described in more detail based on the drawings.

DETAILED DESCRIPTION OF THE INVENTION

Figure 1:
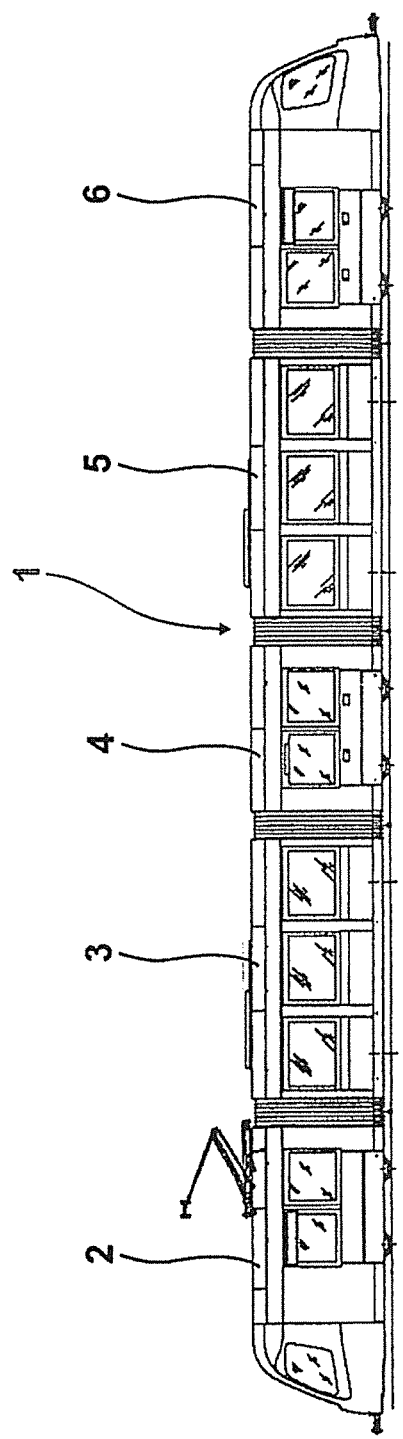
FIG. 1 is a side view of schematically shows a rail vehicle consisting of several parts.

Referring to FIG. 1, rail vehicle labeled 1 consists of five vehicle parts 2, 3, 4, 5 and 6. The vehicle parts 2, 4 and 6 are respectively provided with one bogie, whereas the vehicle parts 3 and 5 are configured in the manner of a litter. The individual vehicle parts are coupled to each other by an articulated connection, e.g. by a ball joint (not shown), which allows for three degrees of freedom. When the track beds are heavily worn, it can happen that, when the individual vehicle parts of the rail vehicle 1 are substantially rigidly connected to each other in the roof area, one of the wheel flanges of the middle bogie i.e. that of vehicle part 4 is lifted off the rail.

The device for limiting the roll and/or pitch movements according to the invention serves to prevent this amongst other things. In the representation according to FIG. 2, the two vehicle parts are labeled 4 and 5. The two consoles 10 and 20 respectively configured in the manner of a leaf spring are located on the front sides of the car bodies of the vehicle parts 4 and 5. The consoles 10 and 20 have different configurations; however, it must be pointed out at this point that the two consoles can also be configured as a pair of identical consoles. The choice of the console structure and combination to be used depends on certain external conditions such as e.g. the spring deflection. The console 10 comprises two legs 11 and 12, which have an approximately trapezoidal shape in a view when viewed from above. The two legs 11 and 12 are screwed to the front side of the car body of the vehicle part 5. At their free ends (arrow 13), the two legs are connected to each other. In the area of the free ends of the two legs (arrow 13), there is a ball joint 14 to rotatably and pivotably accommodate a coupling arm 30. The coupling arm 30 is rigid but modifiable in length so that it is precisely adjustable to the distance between the free end of the console 10 and the free end of the console 20 in the neutral position of the vehicle parts relative to each other. The console 20, which also has a ball joint 24 to rotatably and pivotably accommodate the coupling arm, also has two legs 21 and 22, which are connected to each other at their free ends (arrow 23).

In the present case, the two legs 11, 12, respectively 21, 22, form the leaf spring 10, respectively 20. However, it is also conceivable to form a leaf spring with only one leg 11 or 12 or 21 or 22. Both variants form respectively one console, the two consoles being connected to each other by the coupling arm 30.

At least one console 10, 20 preferably comprises a damper 40 that is preferably configured as a piston-cylinder damper similarly to a shock absorber. The damper 40 is articulated with its one end in the area of the free end of the console 10 and connected with its other end to the car body of the vehicle part 5, for example by way of an angled piece 17. Alternately or additionally, the console 20 can be provided with such a damper 40. This means that both consoles 10, 20 can also be dampened as is shown for example in FIG. 3.

Figure 2:
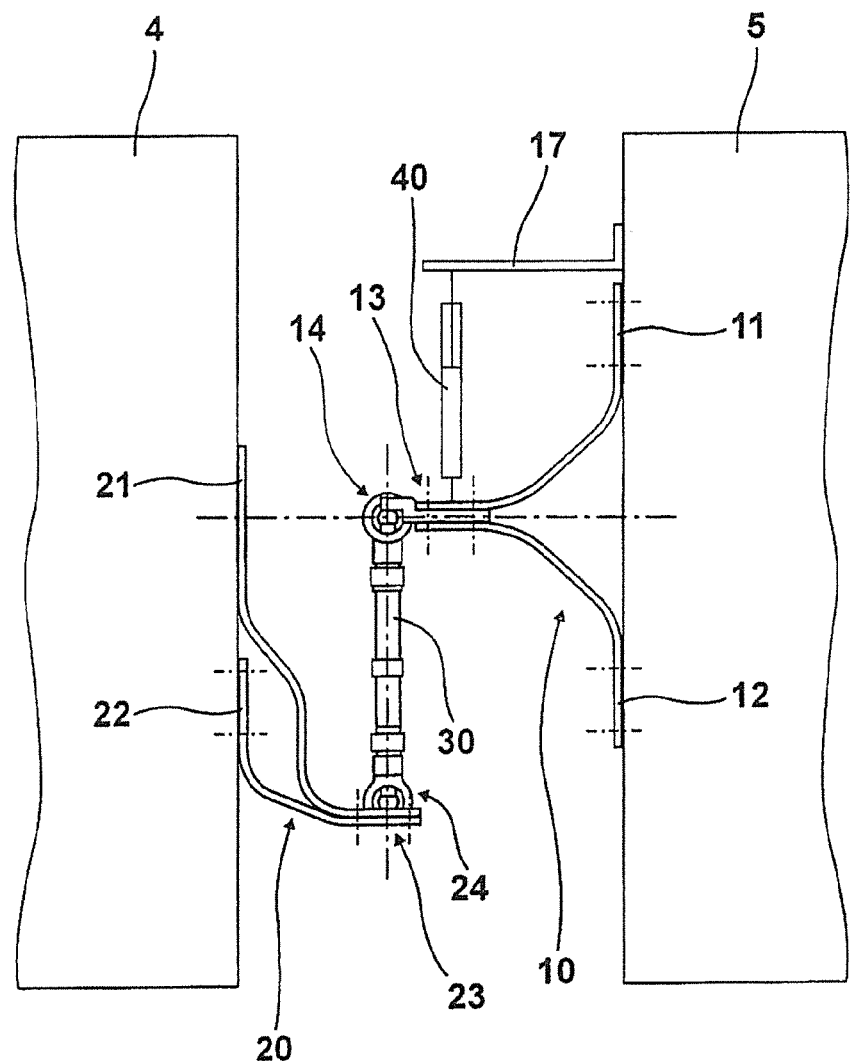
FIG. 2 is a view of a shows the device for limiting the roll and/or pitch movements of the vehicle parts according to a first embodiment.
Figure 3:
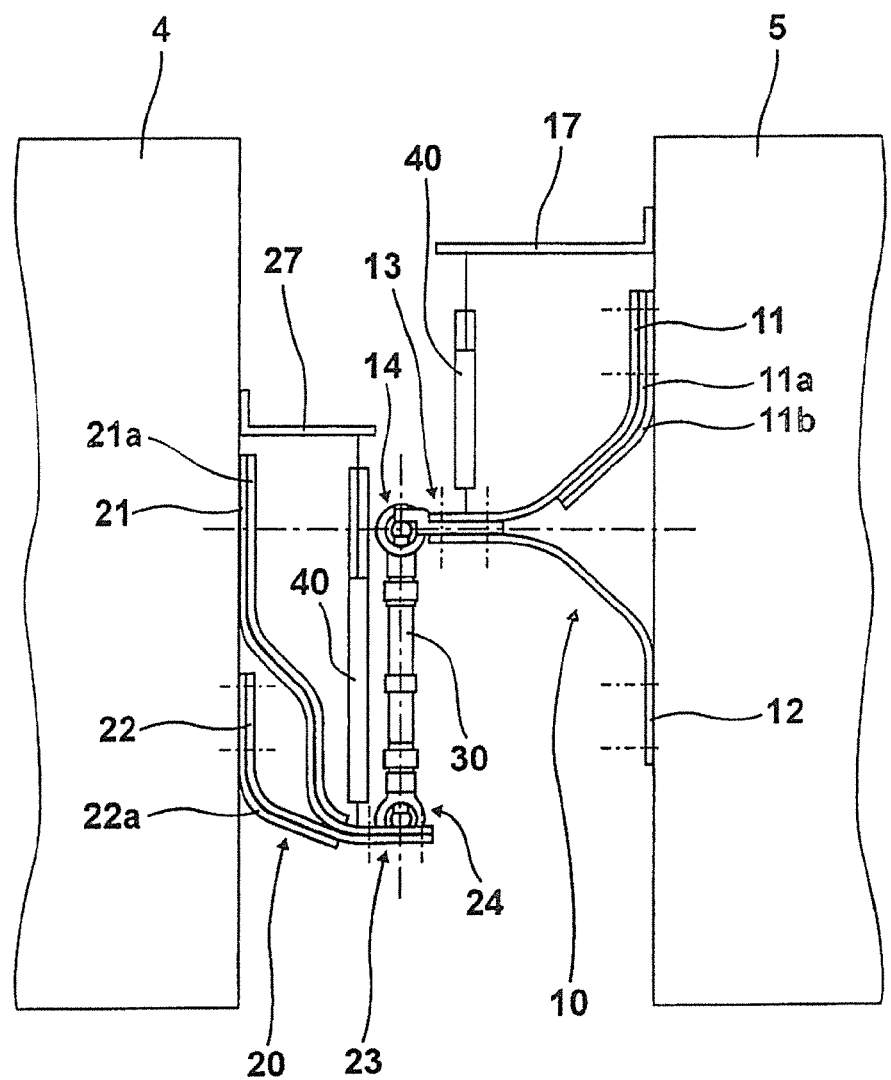
FIG. 3 is a view of the device shows a representation according to a second embodiment.

The embodiment according to FIG. 3 incidentally differs from the embodiment according to FIG. 2 in that the individual consoles 10, 20 are here stiffened with regard to their individual legs 11, 21, 22 by the arrangement of several superimposed leaf-shaped elements 11a, 11b, respectively 21a and 22a, in order to allow for an individual force-path characteristic. The damper 40 in the area of the console 20 is connected to the car body of the vehicle part 4 by way of the angled piece 17. Regarding the articulation of the coupling arm, the embodiment according to FIG. 3 is identical to that of FIG. 2. The difference between the FIGS. 2 and 3 is only that in FIG. 3, as opposed to FIG. 2, individual legs of the consoles have been stiffened, whereas others have remained the same, so that, as has already been explained, specific spring characteristic curves can be provided.

LIST OF REFERENCE NUMBERS 1 rail vehicle
2 vehicle part
3 vehicle part
4 vehicle part
5 vehicle part
6 vehicle part
10 console
11 leg
11a leaf spring element
11b leaf spring element
12 leg
13 arrow
14 ball joint
17 angled piece
20 console
21 leg
21a leaf spring element
22 leg
22a leaf spring element
24 ball joint
27 angled piece
30 coupling arm
40 damper

The invention claimed is:

1. A device for coupling a roof area of two articulated vehicle parts, for limiting roll and/or pitch movements of the vehicle parts relative to each other, the device comprising:
   at least two consoles, at least one of the consoles being disposed on the roof area of a vehicle part;
   a coupling arm, the at least two consoles being connected to each other by the coupling arm disposed transversely to a longitudinal axis of a vehicle in connection with the device; and
   the at least two consoles each comprising a leaf spring that has an end attached to a generally vertical surface at the roof area and an other end attached to an end of the coupling arm.

2. A device in accordance with claim 1, wherein:
the at least two consoles are each disposed on one of the vehicle parts and are transversely offset relative to each other.

3. A device in accordance with claim 1, wherein:
the leaf spring comprises several leaf spring elements forming a leaf spring package.

4. A device in accordance with claim 1, wherein:
at least one of the consoles comprises a leaf spring with at least one leg.

5. A device in accordance with claim 1, wherein:
at least one of the consoles comprises a leaf spring with at least two legs which are connected to each other at their free ends.

6. A device in accordance with claim 5, wherein:
the free ends of the at least two legs rest on each other.

7. A device in accordance with claim 1, wherein:
the coupling arm is rigid.

8. A device in accordance with claim 1, wherein:
the length of the coupling arm is variable.

9. A device in accordance with claim 1, wherein:
the coupling arm is articulately connected to the at least two consoles.

10. A device in accordance with claim 1, wherein:
at least one of the consoles further comprises a damper.

11. A device in accordance with claim 10, wherein:
the damper has one end in an area of a free end of the at least one of the consoles and an other end on the vehicle part associated with at least one of the consoles.

12. A device in accordance with claim 10, wherein:
the damper is a piston cylinder damper.

13. A device for coupling a roof area of two articulated vehicle parts, for limiting roll and/or pitch movements of the vehicle parts relative to each other, the device comprising:
at least two consoles, at least one of the consoles being disposed on the roof area of a vehicle part;
a coupling arm, the at least two consoles being connected to each other by the coupling arm disposed transversely to a longitudinal axis of a vehicle in connection with the device; and
at least one of the console comprising a leaf spring that has an end attached to a generally vertical surface at the roof area and an other end attached to an end of the coupling arm.

14. A device in accordance with claim 13, wherein:
the at least two consoles are each disposed on one of the vehicle parts and are transversely offset relative to each other.

15. A device in accordance with claim 13, wherein:
the leaf spring comprises several leaf spring elements forming a leaf spring package.

16. A device in accordance with claim 13, wherein:
the at least one console that comprises a leaf spring has at least one leg.

17. A device in accordance with claim 13, wherein:
the at least one console that comprises a leaf spring has at least two legs which are connected to each other at their free ends.

18. A device in accordance with claim 13, wherein:
the coupling arm is rigid and the length of the coupling arm is variable.

19. A device in accordance with claim 13, wherein:
the coupling arm is articulately connected to the at least two consoles.

20. A device in accordance with claim 13, wherein:
at least one of the consoles further comprises a damper.

21. A device in accordance with claim 20, wherein:
the damper has one end in an area of a free end of the at least one of the consoles and an other end on the vehicle part associated with at least one of the consoles.

22. A device in accordance with claim 20, wherein:
the damper is a piston cylinder damper.

* * * * *